United States Patent

[11] 3,596,714

[72] Inventor Henry F. Dunlap
 Dallas, Tex.
[21] Appl. No. 737,114
[22] Filed June 14, 1968
[45] Patented Aug. 3, 1971
[73] Assignee Atlantic Richfield Company
 Philadelphia, Pa.

[54] REDUCTION OF RADIOACTIVITY IN A NUCLEAR CHIMNEY AFTER STIMULATION OF A GAS RESERVOIR
12 Claims, 2 Drawing Figs.

[52] U.S. Cl.................................................. 166/247,
 166/263, 166/271, 176/37
[51] Int. Cl....................................................... E21b 43/26
[50] Field of Search............................................ 166/247,
 263, 268, 271, 305; 176/37

[56] References Cited
UNITED STATES PATENTS
3,342,257 9/1967 Jacobs et al. ................. 166/247
FOREIGN PATENTS
1,278,435 10/1961 France ......................... 166/247
OTHER REFERENCES
Carlson, Roland H. Constructing Underground Storage Facilities With Nuclear Facilities. In Pet. Eng' r., Aug. 1959, pp. B- 32 thru- 34. (Copy in 166—247)

Lombard, D. B. Recovering Oil From Shale With Nuclear Explosives. In J. Pet. Tech., Aug., 1965, pp. 877— 882 (Copy in 166—247)

Ward, D. C., et al. Project Gasbuggy— A Nuclear Fracturing Experiment. In J. Pet. Tech., Feb. 1966, pp. 139— 145. (Copy in 166—247)

*Primary Examiner*—Ian A. Calvert
*Attorneys*—Norbert E. Birch and Blucher S. Tharp ABSTRACT: Gaseous radioactivity in a chimney after stimulation of a gas reservoir with a nuclear explosive is reduced by injecting a heavy gas substantially free of unreacted oxygen into the lower portion of the chimney to displace the lighter, radioactive contaminated gas out of the upper portion of the chimney. Several ways are given for determining the minimum amount of heavy gas to be injected. The heavy gas may be backflowed from the chimney and uncontaminated natural gas may be injected into the upper portion of the chimney to displace the heavy gas from the lower portion of the chimney. Due to drilling difficulties, injection of gas into and production of gas from the chimney may be conducted through a single, dually completed well drilled alongside the chimney in the fractured zone immediately adjacent the chimney.

Patented Aug. 3, 1971 3,596,714

INVENTOR.
Henry F. Dunlap

BY

Blucher & Sharp
Attorney

REDUCTION OF RADIOACTIVITY IN A NUCLEAR CHIMNEY AFTER STIMULATION OF A GAS RESERVOIR

BACKGROUND OF THE INVENTION

This invention relates to methods for stimulating subsurface gas reservoirs with a nuclear explosive, and, more specifically, to a method of reducing radioactivity in a chimney created by a nuclear explosion positioned to stimulate production of a subsurface gas reservoir.

Since the Plowshare Program was established to investigate and develop peaceful uses for nuclear explosives, numerous underground nuclear tests have been carried out in the United States in various rock-types. These tests have yielded a consistent sequence of events and provide adequate understanding of the phenomena involved to predict the effects of a nuclear explosion in a gas reservoir. In all tests, except for a minor few involving very low yield explosions in formations unlike gas reservoirs, the nuclear explosion results in a vertically extended, cylindrical, rubble-containing chimney.

The events leading to the formation of this cylindrical vertical chimney of broken rock involve emplacing in a borehole a nuclear explosive (a fusion or fission, or combination bomb) of sufficient yield to produce an unstable cavity which will collapse to form the chimney. The nuclear explosive is detonated, producing in microseconds high amounts of energy and heat that are unthinkable in any other form of explosive even though it is standard practice to state the yield of a nuclear device in terms of equivalent kilotons of TNT (trinitrotoluene) with a kiloton equaling a prompt energy release of $10^{12}$ calories.

Upon detonation, an initial cavity is formed as a result of vaporization, melting and crushing of adjacent rock media. The gases within the cavity are at extremely high temperature on the order of millions of degrees and pressure amounting to millions of atmospheres. The expanding energy of the gases compacts and thrusts the surrounding rock outward, creating a fractured zone and a spherical cavity. This high internal pressure expands the cavity until the internal pressure is equivalent to the overburden pressure. At this point the gas pressure supports the overburden, thus preserving the shape of the cavity for a temporary period of time. The radius of the cavity is a function of the energy yield of the explosive, and, to a much lesser extent, the rock media characteristics and depth of burial.

After a period of time, the pressure is reduced until the pressure within the cavity is below the overburden pressure and the fractured rock above the cavity can no longer be supported. The roof of the cavity collapses in bits and pieces which periodically fall to the bottom of the cavity. A cylindrical column (chimney) of broken rock develops upward as the cavity fills with rock falling from the roof. Roof collapse continues progressively upward until the volume or interstitial space between the pieces of broken rock in the chimney approximates the original cavity volume before the cavity began to collapse.

The vertical, cylindrical volume of broken rock, called a chimney, has the same diameter as the original cavity and has a height of about four to five times the cavity radius. The ratio of chimney height to original cavity radius is, therefore, dependent on the bulk porosity of the broken chimney rock and the cavity volume before collapse. More explicitly, the height of the chimney is about four times the cavity radius divided by three times the net increase in porosity in the rubbled zone stated in a fraction. This fraction ranges between 0.2 and 0.3 and for petroleum reservoirs will probably be on the order of 0.25. In addition to the chimney, the nuclear explosion creates a fractured zone which extends both radially and vertically from the chimney.

When the nuclear explosive is used to stimulate a gas reservoir, as in Project Gasbuggy, the chimney fills with gas containing gaseous radioactive products. It has been proposed to remove these gaseous radioactive products allowing the short lived radioactive substances to decay. The remaining longer lived radioactive gases are then removed from the chimney by producing the gas reservoir. This, in effect, flushes the radioactive gases from the chimney by mixing the contaminated chimney gas with new natural gas brought in from the formation. The produced contaminated gas could be diluted further at the surface with other natural gases, or the contaminated gas could be flared, or other disposal systems could be used such as placing the gas in a subsurface aquifier or storage zone to allow the long lived radioactive substances to decay.

Simply flushing the chimney as suggested has many disadvantages, chief of which is the number of chimney volumes of gas that would need to be produced to remove the radioactive gases. The efficiency of this type of flushing process is dependent on the productivity of the stratified gas-bearing formations traversed by the chimney which are not uniformly located relative to the chimney volume. Normally, the gas formations will be at many points up and down the length of the chimney and vary in productivity. An efficient flushing mechanism is not achieved because such a flushing system depends on intimate mixing of fresh gas with radioactive contaminated gas. Even with most efficient intimate mixing, flaring the first chimney volume would be expected to reduce the radioactive concentration by only a factor of two, and the second chimney volume by a factor of four, and the third chimney volume by a factor of eight. Much greater reductions with a more efficient use of gas are desired.

SUMMARY OF THE INVENTION

This invention provides a more efficient method for reducing radioactivity in a chimney when a nuclear explosive has been positioned and detonated to stimulate production of a subsurface natural gas reservoir. The method does not depend upon intimate mixing of contaminated and uncontaminated gases to remove radioactive gases from the chimney, and, thereby, provides for more efficient and reliable removal of the radioactive gases.

The gaseous radioactivity in the chimney is reduced by injecting from the surface into a lower portion or lower one-quarter of the chimney a gaseous material substantially free of elemental oxygen, that is, unreacted oxygen. The gaseous material will also be free of detrimental radioactive materials. The injected gaseous material has a density greater than the density of the natural gas to be produced from the stimulated reservoir. The amount of heavy gaseous material injected may be determined in one of two ways as hereinafter described. Simultaneously with injection of the heavy displacing gaseous material, contaminated chimney gas is produced from an upper portion of the chimney at a rate at least as great as the rate of injection of the gaseous material so that contaminated chimney gas will not be forced into the formation.

First, the minimum amount of heavy gaseous material at reservoir or chimney pressure and temperature may be related to the interstitial volume of the rubble in the chimney which in turn is related to the volume of the sphere-shaped cavity created by the nuclear explosion. In accord with this concept, the minimum amount of heavy gaseous material injected is the volume of gaseous material at chimney conditions required to fill a sphere whose radius is determined by the following equation:

$$R = \frac{238 W^{1/3}}{h^{1/4}} \qquad (1)$$

where $R$ is the radius of the sphere in feet, $W$ is the estimated yield of the nuclear explosion in equivalent kilotons of TNT and $h$ is the depth of burial in feet of the nuclear explosion.

An alternative to injecting a minimum volume of gaseous material equal to the volume of a sphere is to inject the gaseous material until there is sufficient change in the composition of the chimney gas produced from the upper portion of the chimney to indicate that injected dense gaseous material is being produced.

Injection of the heavier displacing gas is ceased and a gas rich in the heavier gaseous material may be produced from the lower portion of the chimney to backflow the heavier gas out of the chimney. At the same time, an uncontaminated light natural gas may be injected into the top portion or top quarter of the chimney to assist in this method for removing radioactive gas. This also avoids overmixing of the chimney gas with new natural gas from the formation.

Since it will be difficult to drill through the chimney due to caving and lost circulation, a preferred method of carrying out this operation would be to drill a single well alongside of the chimney in the fractured zone surrounding it. This zone has high permeability and is in good communication with the chimney, but is still competent enough to drill through by conventional methods. Production and injection into the top or bottom portions of the chimney could be carried out from this well by using conventional dual completion techniques through the tubing and casing. Later, production from a well located in this fractured zone will not be substantially reduced as compared to the well completed in the chimney itself.

DESCRIPTION OF PREFERRED EMBODIMENTS

This invention relates to a method of reducing radioactivity after stimulation of surface natural gas reservoir with a nuclear explosion. More specifically, this method applies to a way for removing gaseous radioactive products from a cavity or chimney created by a nuclear explosion detonated in a gas-bearing subsurface region. The method is more efficient and reliable than methods relying on intimate mixing of gases. This method is applied before a substantial portion of the stimulated gas reservoir is produced.

Figure 1:
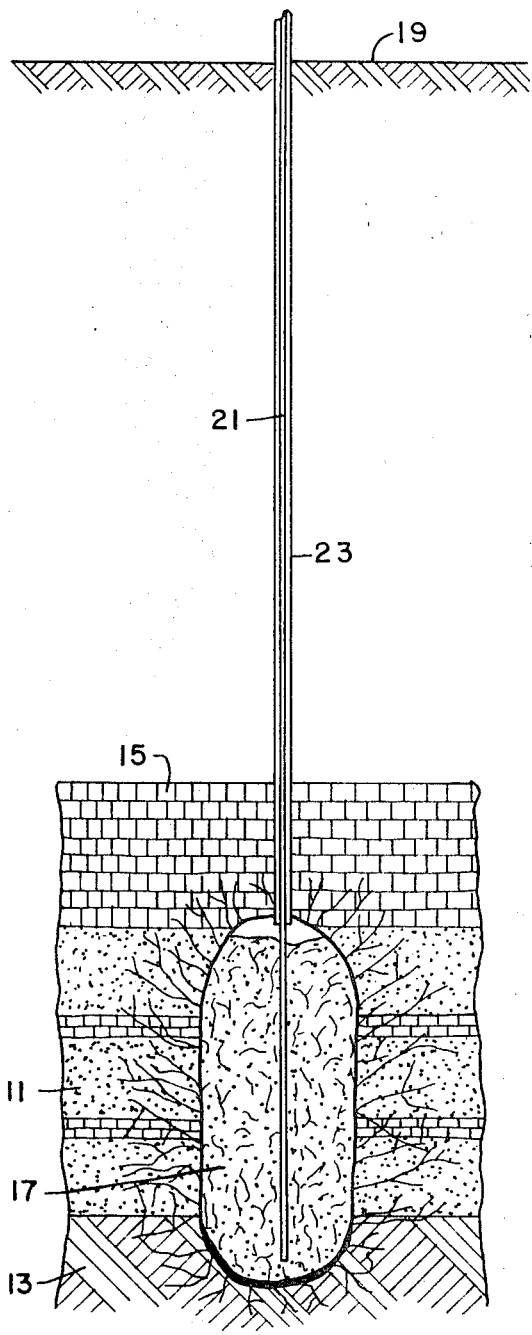
FIGS. 1 and 2 are vertical cross-sectional views of a chimney associated with a stratified gas reservoir and showing two ways to complete a well for carrying out this invention.
Figure 2:
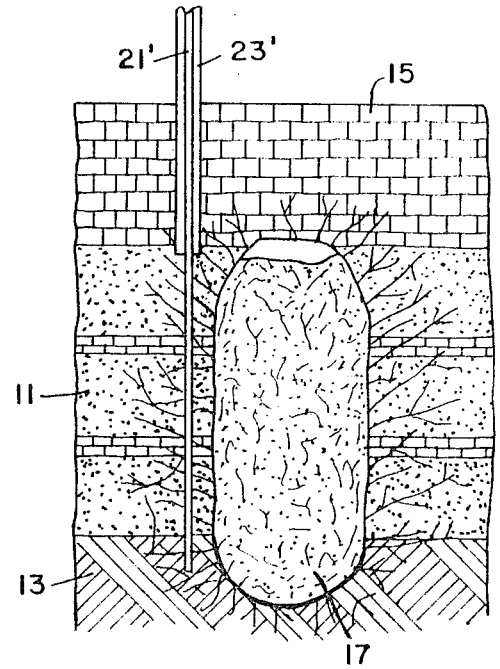

The events leading up to application of this method are best understood by reference to FIGS. 1 and 2 where there is depicted low-productivity, stratified gas reservoir 11 made up of interbedded gas-bearing sands and shale deposits underlain by shale zone 13 and overlain by containing impermeable shale zone 15. Rubble-containing chimney 17 traverses much of the gas reservoir and is substantially surrounded by the low permeability gas-bearing zones. This chimney, surrounded by a fractured area of increased permeability, stimulates the flow of natural gas from the reservoir into the chimney into which one or more gas recovery wells are completed.

Chimney 17 will be created by a nuclear explosion in a conventional manner. For example, an emplacement borehole is completed far enough below surface 19 to provide a contained nuclear explosion. A nuclear explosion is contained when the explosive energy will not cause a crater at the surface of the earth. A review of the results of 60 nuclear blast experiments indicates that there is better than a 90 percent chance that the nuclear blast will not crater to the surface if the scaled depth of burial is about 300 feet or deeper. Scaling takes into consideration the yield of the explosive. Some nuclear explosives cratered to the surface of the earth at scaled depths as great as 650 feet; therefore, a scaled depth of burial of more than 650 feet is preferred to assure absolute containment. The scaled depth of burial ($SDB$) in feet is converted to the actual depth of burial ($D$) in feet by the following equation (2):

$$D = (SDS) W^{1/3.4} \quad (2)$$

where $W$ is the expected yield of the nuclear device in kilotons of trinitrotoluene (TNT).

A nuclear explosive device (a fusion, or fission or combination explosive) is then placed in the emplacement well and located to stimulate gas reservoir 11 without breaking through or into liquid-producing formations. The nuclear explosive is of sufficient yield to stimulate the gas reservoir. The emplacement borehole is then stemmed to contain the force and effects of the blast. The nuclear explosive is detonated, producing in microseconds high amounts of energy and heat that are unthinkable in any other form of explosive even though it is standard practice to state the yield of a nuclear device in terms of kilotons of TNT.

Upon detonation, an initial cavity is formed as a result of vaporization, melting and crushing of adjacent rock media. The gases within the cavity are at extremely high temperature on the order of millions of degrees and pressure amounting to millions of atmospheres. The expanding energy of the gases compacts and thrusts the surrounding rock radially outward from the shop point creating in fractions of a second a generally spherical cavity. This high internal pressure expands the cavity until the internal pressure is equivalent to the overburden pressure. At this point the gas pressure supports the overburden, thus preserving the shape of the cavity for a temporary period of time. The radius of the cavity produced by a nuclear explosive is a function of the energy yield of the explosive and, to a lesser extent, the depth of burial, the average density of the overlying formations, the vapor-forming liquid content of the host rock, and the rock properties. The equation for the cavity radius is:

$$R = \frac{CW^{1/3}}{(dh)^{1/4}} \quad (3)$$

where $R$ is the cavity radius in feet, $C$ is a constant depending upon rock and fluid content and ranges between 225 and 345, $W$ is the expected yield of the particular nuclear device in equivalent kilotons of TNT, $d$ is the average overburden density in grams per cubic centimeter ranging from about 1.6 to 2.7, and $h$ is the depth of burial in feet. Suitable estimates for purposes of this invention may be derived by using a value of 290 for the constant $C$ and 2.2 for $d$. When these values for the constant $C$ and for the density $d$ are substituted in equation (3), the equation for the cavity radius $R$ is simplified as follows:

$$R = \frac{238 W^{1/3}}{h^{1/4}} \quad (4)$$

By way of illustration, a 10 kiloton device placed 4000 feet below the surface would produce a cavity having a radius of 64 feet. In Project Gasbuggy, a device having a yield of about 25 kilotons and placed at 4240 feet will produce a cavity of about 80 to 85 feet.

After a period of time, the pressure is reduced until the pressure within the cavity is below the overburden pressure. At this point, most cavities created by a nuclear explosion are unstable and the roof of the cavity collapses in bits and pieces which periodically fall to the bottom of the cavity. A cylindrical column (chimney 17) of broken rock develops upward as the cavity fills with rock falling from the roof. Roof collapse continues progressively upward until the volume of interstitial space between the pieces of broken rock in the chimney approximates the original cavity volume before the cavity began to collapse. For this reason, as will be hereinafter explained, the volume of this spherical cavity is used in placing minimum limits on the volume of a heavy gas used in the method of this invention.

The vertical, cylindrical volume of broken rock and void spaces is called a chimney. The chimney is surrounded by the formations shown. For nuclear explosions in fairly competent formations or in deep formations of the type encountered in natural gas production, the chimney has essentially the same diameter as the original cavity and has a height of about four to seven times the cavity radius. The ratio of chimney height to original cavity is, therefore, dependent on the bulk porosity of the broken chimney rock and the cavity volume before collapse. More explicitly, the height is about four times the cavity radius divided by three times the net increase in porosity in the rubbled zone stated in a fraction. This fraction ranges between 0.2 and 0.3 and for the formations used here will probably be on the order of 0.25. The interstitial voids or pores formed by the rubble have a high conductivity and provide a suitable volume or reservoir for collecting natural gas. The rubble-containing chimney also has a high enough conductivity to readily allow the effects of gravity to act.

When the nuclear explosive is used to stimulate a gas reservoir, the chimney will be surrounded by a low permeability gas reservoir over most or all of the vertical extent of the chimney. As the gases cool and some of them condense (for example, water vapor), the pressure in the chimney will continue to fall until the temperature equals the formation temperature. At this time due to the new volume created by the nuclear explosion, the chimney pressure will usually be substantially less than the hydrostatic pressure at that depth unless fluids flow into the chimney from the surrounding rock. The rubble-containing chimney will fill up with gas from the formation until formation pressure is reached. The gas in the chimney will contain gaseous radioactive products. After a short period of time, for example, 8 months for a 10 kiloton device at 4000 feet, radioactive decay will decrease most of the gaseous radioactive products leaving krypton 85 and tritium as the main potentially hazardous radioactive materials whose half lives are 10.6 years and 12.6 years respectively. Krypton is a noble gas and the tritium may be present as tritiated water vapor, or tritiated hydrogen or in gaseous organic form. The method of this invention is directed to reducing the amount of radioactive gaseous products in a gas-filled chimney or cavity.

As mentioned previously, after the chimney is formed, chimney 17 is filled with natural gas contaminated with gaseous radioactive products. The density of this contaminated chimney gas is between 0.55 and 1.17 grams per liter at a temperature of zero degrees centigrade and at a pressure of one atmosphere with the usual density being between about 0.85 and 0.95 grams per liter.

The radioactivity in chimney 17 is reduced by injecting an uncontaminated gaseous material through one or more flow conduits into a lower portion or lower quarter of the chimney. As illustrated, this gaseous material is injected from surface 19 by way of lower flow conduit 21 which is placed as close to the bottom of the chimney as is practical. This flow conduit may be in the chimney itself as shown in FIG. 1, or in the fractured zone surrounding the chimney as shown in FIG. 2.

The injected gaseous material must be substantially free of elemental oxygen, that is, oxygen in its unreacted atomic or molecular form; moreover, the gaseous material must have a density greater than the density of the natural gas in reservoir 11 at chimney conditions of pressure and temperature. Examples of suitable dense gaseous materials with their respective densities at zero degrees centigrade and one atmosphere are carbon dioxide having a density of 1.98 grams per liter, ethane having a density of 1.36 grams per liter, nitrogen having a density of 1.25 grams per liter, propane having a density of 2.0 grams per liter, flue gas having a density between 1.3 and 1.98 grams per liter, and any other dense, oxygen-free gas that would not undesirably affect natural gas.

At the same time and simultaneously with injection of the dense gaseous material, the upper portion or upper quarter of the chimney is produced by one or more flow conduits to remove contaminated chimney gas. As illustrated, this is accomplished through upper flow conduit 23 whose lower end is placed as close to the top of the chimney as is practical. Flow conduit 23 may be in the chimney itself as shown in FIG. 1, or in the fractured zone surrounding the chimney as shown in FIG. 2. This contaminated chimney gas is produced at a rate approximately equal to but at least as great as the rate of injection of the denser gaseous material. This avoids forcing contaminated radioactive chimney gas back into the gas reservoir. Preferably, the rate of production of the contaminated chimney gas will be maintained close to the rate of injection so as to avoid unnecessary production and loss of new natural gas from the reservoir and to avoid undue mixing of the different gases.

The minimum amount of dense gaseous material injected may be determined in two ways. The first way is related to the interstitial volume of the voids and rubble in the chimney. The second way is to inject dense gaseous material until there is a significant change in the physical, chemical, or radioactive properties, or a combination thereof, of the exiting gas which is produced from the upper portion of the chimney. A change in these properties of the gas is herein referred to as a change in composition of the gas.

When the minimum amount is related to the interstitial volume of the chimney, the minimum amount of dense gaseous material injected is the amount of gaseous material sufficient at chimney pressure and temperature to at least fill a sphere whose radius is the radius of the cavity as calculated in accordance with equation (4). The volume of this sphere is 4.189 times the radius of the cavity cubed ($R^3$). As noted previously, this minimum amount is based on the fact that the cavity volume is translated into interstitial volume in the rubble-containing chimney. The volume of gaseous material to be injected to meet this requirement is readily determined using conventional pressure, volume, temperature and compressibility constants for the gaseous material at chimney pressure and temperature. The chimney pressure is readily ascertainable by conventional bottom-hole pressure tools or adding the surface pressure of the chimney gas to the pressure developed by the weight of a column of gas above the bottom of the chimney. The chimney temperature may be determined by any conventional bottom-hole temperature measuring device; however, since the temperature in the chimney will be higher than the temperature at the surface, if preferred, the temperature of the chimney may be neglected when determining the minimum amount of gaseous material to be injected because the higher the temperature in the chimney, the lesser will be the amount of gaseous material that must be injected to fill the chimney.

Another and simpler way to establish the minimum amount of dense gaseous material to inject is to inject gaseous material until the composition (which as mentioned previously includes physical, chemical and radioactive properties as well as combinations thereof) of the gas exiting or being produced from the upper portion of the chimney changes enough to indicate that dense injected gaseous material is being produced. There are numerous well-known and conventional ways to monitor the composition and radioactivity of a gas at the surface or to trace and detect the flow of an injected gas; consequently, such techniques will not be described herein.

When the desired amount of dense gaseous material has been injected, injection of this gaseous material is ceased. At this point, the gas reservoir may be produced. Preferably, however, gas will first be produced from only the lower portion of the chimney by way of the same flow conduit system used to inject the dense gaseous material, for example, by way of lower flow conduit 21. If the produced gas contains a safe amount of radioactivity, attempts to produce gas from only the lower portion of the chimney could be terminated; however, production of gas from the lower portion of the chimney will normally be continued until the volume of gas produced is at least equal to the volume of the sphere of cavity radius $R$ at chimney pressure and temperature as previously described, or, in the alternative, until there is enough change in the composition of the gas produced from the lower portion of the chimney to indicate that a major portion (50 percent or more) of the gas is methane which is the main constituent of natural gas.

Production of the lower portion of the chimney may be accomplished by allowing new, light, methane rich natural gas to flow from the reservoir into the chimney. It will be preferred, however, to inject light, methane rich natural gas from the surface by way of upper flow conduit 23 into the top portion of the chimney to displace the heavier chimney gas back out of lower flow conduit 21. This avoids the type of mixing that arises when the reservoir is produced and gas flows into the chimney from the reservoir at many levels along the chimney. Injection of lighter gas at the surface assures better control and reduction of the amount of gaseous radioactivity in the chimney. When the gas has been backflowed or back produced, the chimney will be left full of natural gas and ready for production.

If necessary, the entire above procedure can be repeated in order to obtain a sufficiently low radioactivity level in the produced gas. In all cases, however, the amount of gas flared or wasted by using the methods described will be less than if the chimney gas were simply diluted in the conventional manner by simply mixing with gas which flows into the chimney from the reservoir.

As mentioned previously, lower and upper flow conduits 21 and 23 may be outside the chimney in the fractured zone surrounding the chimney as shown in FIG. 2. It is difficult to drill through the gas filled rubble of chimney 17 due to caving and lost circulation; therefore, as shown, lower flow conduit 21 and upper flow conduit 23 may be part of a well drilled and dually completed in a conventional manner outside and alongside of the chimney in the fractured zone. This zone has high permeability and is in good communication with the chimney, but is still competent enough to drill through by conventional methods. Production and injection into the top or bottom portions of the chimney would be carried out from this dually completed well by using conventional dual completion techniques through the tubing and casing. Later production from this well located in this fractured zone will not be substantially reduced as compared to the well completed in the chimney itself. The radius of the fractured zone from the shot point is between 2.4R and 5.3R, where R is the radius of the cavity in feet. For safety's sake, the well should be drilled and spaced laterally from the shot point by a distance of less than three cavity radii (3R) when the radii are calculated in accordance with equation (4); consequently, the well will be within two cavity radii of the chimney.

From the foregoing it will be appreciated that this invention provides an efficient way for removing radioactive gases from a chimney associated with a gas reservoir and that ones skilled in the art may suggest changes and means for carrying out this invention without departing from the spirit of the invention as defined by the appended claims.

What I claim is:

1. An improved method of reducing radioactivity in a chimney formed by a contained subsurface nuclear explosion located to stimulate a natural gas-producing reservoir, which method comprises injecting from the surface into a lower portion of said chimney a gaseous material substantially free of elemental oxygen and having a density greater than the density of said natural gas, the amount of said gaseous material injected being sufficient at chimney pressure and temperature to at least fill a sphere whose radius is determined in accordance with the following equation:

$$R = \frac{238 W^{1/3}}{h^{1/4}}$$

where $R$ is the radius of the sphere in feet, $W$ is the estimated yield of said nuclear explosion in equivalent kilotons of TNT and $h$ is the depth of burial of the nuclear explosion in feet, and simultaneously with injection of said gaseous material, producing contaminated chimney gas from an upper portion of said chimney at a rate at least as great as the rate of injection of said gaseous material.

2. The improved method of claim 1 wherein injection of said gaseous material into said lower portion of said chimney is ceased and gas is produced from only said lower portion at least until the volume of said gas produced at chimney pressure and temperature is equal to said volume of said sphere.

3. The improved method of claim 2 wherein while said gas is being produced from said lower portion of said chimney, natural gas having a density less than the density of said injected gaseous material is injected from the surface into said top portion of said chimney.

4. The improved method of claim 1 wherein the method includes the step of drilling and dually completing a well outside of said chimney and spaced laterally from said chimney within two radii of said sphere, said dually completed well having a lower conduit opposite said lower portion of said chimney and an upper conduit opposite said upper section of said chimney, and the steps of injecting said gaseous material and producing gas from said chimney are carried out through said well.

5. The improved method of claim 4 wherein injection of said gaseous material into said lower portion of said chimney is ceased and gas is produced from only said lower portion at least until the volume of said gas produced at chimney pressure and temperature is equal to said volume of said sphere.

6. The improved method of claim 5 wherein while said gas is being produced from said lower portion of said chimney, natural gas having a density less than the density of said injected gaseous material is injected from the surface into said top portion of said chimney.

7. An improved method of reducing radioactivity in a chimney formed by a contained subsurface nuclear explosion located to stimulate a natural gas-producing reservoir, which method comprises injecting from the surface into a lower portion of said chimney a gaseous material substantially free of elemental oxygen and having a density greater than the density of said natural gas, simultaneously with injection of said gaseous material, producing contaminated chimney gas from an upper portion of said chimney at a rate at least as great as the rate of injection of said gaseous material, and continuing injecting said gaseous material and producing said chimney gas at least until there is sufficient change in the composition of said produced chimney gas to indicate that said gaseous material is being produced along with said chimney gas.

8. The improved method of claim 7 wherein injection of said gaseous material into said lower portion of said chimney is ceased and gas is produced from only said lower portion at least until there is sufficient change in the composition of said gas being produced from said lower portion to indicate that methane in natural gas forms a major portion of said gas being produced from said lower portion of said chimney.

9. The improved method of claim 8 wherein while said gas is being produced from said lower portion of chimney, natural gas having a density less than the density of said gaseous material is injected from the surface into said top portion of said chimney.

10. The improved method of claim 7 wherein the method includes the step of drilling and dually completing a well outside of said chimney and spaced laterally from said chimney, said dually completed well having a lower conduit opposite said lower portion of said chimney and an upper conduit opposite said upper section of said chimney, and the steps of injecting said gaseous material and producing gas from said chimney are carried out through said well.

11. The improved method of claim 10 wherein injection of said gaseous material into said lower portion of said chimney is ceased and gas is produced from only said lower portion at least until there is sufficient change in the composition of said gas being produced from said lower portion to indicate that methane in natural gas forms a major portion of said gas being produced from said lower portion of said chimney.

12. The improved method of claim 11 wherein while said gas is being produced from said lower portion of chimney, natural gas having a density less than the density of said injected gaseous material is injected from the surface into said top portion of said chimney.